United States Patent
Campbell

(10) Patent No.: US 6,418,438 B1
(45) Date of Patent: Jul. 9, 2002

(54) DYNAMIC SCALABLE LOCK MECHANISM

(75) Inventor: David G. Campbell, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/212,514

(22) Filed: Dec. 16, 1998

(51) Int. Cl.$^7$ ................................................ G06F 17/00
(52) U.S. Cl. .............................. 707/8; 711/200; 707/2; 707/201
(58) Field of Search ...................... 707/1–206; 711/100; 710/200, 240–243

(56) References Cited

U.S. PATENT DOCUMENTS

| | | | | |
|---|---|---|---|---|
| 5,414,839 A | * | 5/1995 | Joshi | 707/8 |
| 6,009,425 A | * | 12/1999 | Mohan | 707/101 |
| 6,144,957 A | * | 11/2000 | Cohen et al. | 707/3 |
| 6,144,970 A | * | 11/2000 | Bonner et al. | 707/206 |
| 6,145,094 A | * | 11/2000 | Shiriff et al. | 710/200 |
| 6,151,607 A | * | 11/2000 | Lomet | 707/202 |
| 6,185,562 B1 | * | 2/2001 | Dahlen et al. | 710/200 |

OTHER PUBLICATIONS

Yang et al., "JPernLite: extensible transaction services for the WWW", Knowledge and Data Engineering, IEEE Transactions on, vol. 11, Issue 4, pp. 639–657, Jul. 1999.*

Mohan, "ARIES/LHS: A concurrency control and recovery method using write ahead logging for linear hashing with separators" Data Engineering, 1993, Proceedings. Ninth International Confernece on, pp. 243–252, Apr. 1993.*

* cited by examiner

Primary Examiner—David Jung
(74) Attorney, Agent, or Firm—Woodcock Washburn LLP

(57) ABSTRACT

A multilevel data locking mechanism is described. The mechanism determines the cost of multiple granularities of locks for a query prior to initiating a transaction. Locking selection is performed by a lock manager, and is based on row, page and table granularities. An SQL server provides access to a database comprising rows of data arranged in tables. A table has multiple rows per page, and multiple pages per table. Characteristics of the database schema and query are considered in determining which granularity will result in the lowest cost. These factors include the number of rows per page, the number of rows per index scan, the isolation level per scan, an update factor which is related to how long modified rows are held, the memory load on the system, the cost of concurrency which is based on the number of rows per page and pages per table, and the number of active scans currently on the table. The proper granularity is determined at run time to ensure that the current state of the system is considered.

10 Claims, 3 Drawing Sheets

$$\text{MIN} \left\{ \begin{array}{c} \text{TABLE} \\ \text{PAGE} \\ \text{ROW} \end{array} \right\} (\text{COST OF MEMORY} + \text{COST OF CPU} + \text{CONCURRENT COST})$$

$$\text{MIN} \left\{ \begin{array}{c} \text{TABLE} \\ \text{PAGE} \\ \text{ROW} \end{array} \right\} (\text{COST OF MEMORY} + \text{COST OF CPU} + \text{CONCURRENT COST})$$

FIG. 4

DYNAMIC SCALABLE LOCK MECHANISM

FIELD OF THE INVENTION

This invention relates generally to the field of computer data concurrency and in particular to a dynamic cost based multi granularity locking mechanism.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND

Many computer applications use a function referred to as locking to ensure that data the applications are modifying is not modified by another application or process. Locking the data prevents users from changing the same data at the same time. If locking is not used, data may become logically incorrect, and future use of the data may produce unexpected results.

If locking is not used in a database system, multiple transactions trying to use the same data concurrently can give rise to several different types of problems referred to as concurrency problems. Sometimes updates of data by one application may be lost if overwritten by another application. Sometimes data is modified, but not immediately written out in a manner that it can be read by other applications. This can also result in reads of data which should be the same, not being the same. Further problems can result from applications using copies of data, which are then changed by a later application.

There are several ways of dealing with the concurrency problem in database servers. Optimistic concurrency works on the assumption that resource conflicts between multiple users are unlikely, and allows transactions to execute without locking any resources. Only when attempting to change data are resources checked to determine if any conflicts have occurred. If a conflict did occur, the application must read the data and attempt the change again. Pessimistic concurrency locks resources as they are required, for the duration of the transaction. Unless deadlocks occur, a transaction is assured of successful completion.

While there are several different types of locks, such as exclusive locks, shared locks, update locks and other types of locks, many of them provide some amount of concurrency to ensure that two applications do not modify data at the same time, or use data which may or may not be accurate. These types of locks consume system overhead and have associated costs. Fine grain locks, which lock on a small amount of data, such as on a row of a database, each have memory resources and processing resources associated with storing and managing them. If many rows are involved in a transaction which needs to lock portions of the database to ensure concurrency, a significant amount of system resources can be consumed. In prior systems, if too many resources are consumed during processing of the transaction, the level of the lock is increased or escalated, such as to the page level during the transaction to reduce the system overhead. This happens when an escalation threshold related to the number of locks used by a transaction is exceeded. There is some expense in changing the level of the lock because first a higher level lock must be obtained. It may not be available immediately until other applications complete operations and release locks on lower levels. This can result in significant delays, and also create problems such as deadlocks if two applications need to lock the same higher level and will not release lower levels until they gain a lock on the higher level. It can be a complex conflict to resolve. Some applications may even time out and restart later, duplicating previous processing as well as resulting in significant delays.

Still other systems may apply a very rough heuristic, such as applying a table lock for a full table scan or row locks for a singleton fetch or partial range scan, in an attempt to ensure completion of a transaction by selecting one of two levels of locking. The levels are usually decided upon between a table and page level, or a table and row level dependent on the operations to be performed. These systems offer very little flexibility, and still need to rely on escalation if available to ensure that transactions have a chance of succeeding.

There is a need for a locking mechanism that ensures transactions can take place without escalating locking levels in the middle of a transaction. There is a need for a locking mechanism that ensures once a transaction is started, it has a good chance of succeeding. There is yet a further need for a locking mechanism that provides good concurrency and good performance.

SUMMARY OF THE INVENTION

A multilevel data locking mechanism determines the cost of multiple levels or granularities of locks for a query prior to initiating a transaction. Locking of data can mean that during a transaction, the locked data is not available for use by other queries, making them wait for execution until the data is unlocked. A granularity of lock is used for the transaction which is a function of cost. By using a dynamic locking strategy to determine the most cost effective granularity of locking for each transaction, overall performance is increased. It also relieves developers of having to consider locking strategies when developing applications.

In an SQL server, the locking selection is performed by a lock manager, and is based on row, page and table granularities. An SQL server provides access to a database comprising rows of data arranged in tables. Data is stored in memory on pages, which are predetermined numbers of bytes, such as four thousand in one server. Usually, a table has multiple rows per page, and multiple pages per table. However, this relationship may vary from database to database.

Given such a granularity relationship, row locking has a high CPU and memory overhead or cost associated with tracking a lock for each row. Page locking has a lower overhead, but may needlessly prevent others from accessing rows that did not really need to be locked, resulting in higher concurrency costs. Finally, table locks can greatly reduce CPU and memory cost, but at the expense of much higher concurrency cost. Each of these costs are calculated or estimated prior to execution of a transaction such as a query, and the locking granularity having the lowest cost is selected for use during the query.

A number of factors based on the characteristics of the database schema and query are considered in determining which granularity will result in the lowest cost. These factors include the number of rows per page, the number of rows per index scan, the isolation level per scan, an update factor which is based on a percentage of scanned rows to be updated, the memory load on the system, the cost of concurrency which is based on the number of rows per page and pages per table, and the number of active scans currently on the table.

The present invention provides a better system performance over the prior methods of locking. By providing dynamic scalable locking based on cost, developers may focus on development of applications as opposed to trying to develop an optimal locking scheme. Determining the proper granularity at run time ensures that the current state of the system is considered, which aids in choosing the proper granularity. It also ensures that the granularity chosen is highly likely to result in a successful scan. Further, it can simplify database administration by not having to readjust locking escalation thresholds to ensure proper execution of queries.

BRIEF DESCRIPTION OF THE DRAWINGS

FIG. 4 is a depiction of the function used for determining which granularity of locking provides the least system cost.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the hardware and operating environment in the form of a computer system which implements the current invention of dynamic granular locking of data. This is followed by a description of the granularity of locks to be used, along with a mechanism which calculates the cost of each granularity in order to select the least expensive. The factors involved in such a determination are discussed, followed by a conclusion which describes some potential benefits and describes further alternative embodiments.

Hardware and Operating Environment

Figure 1:
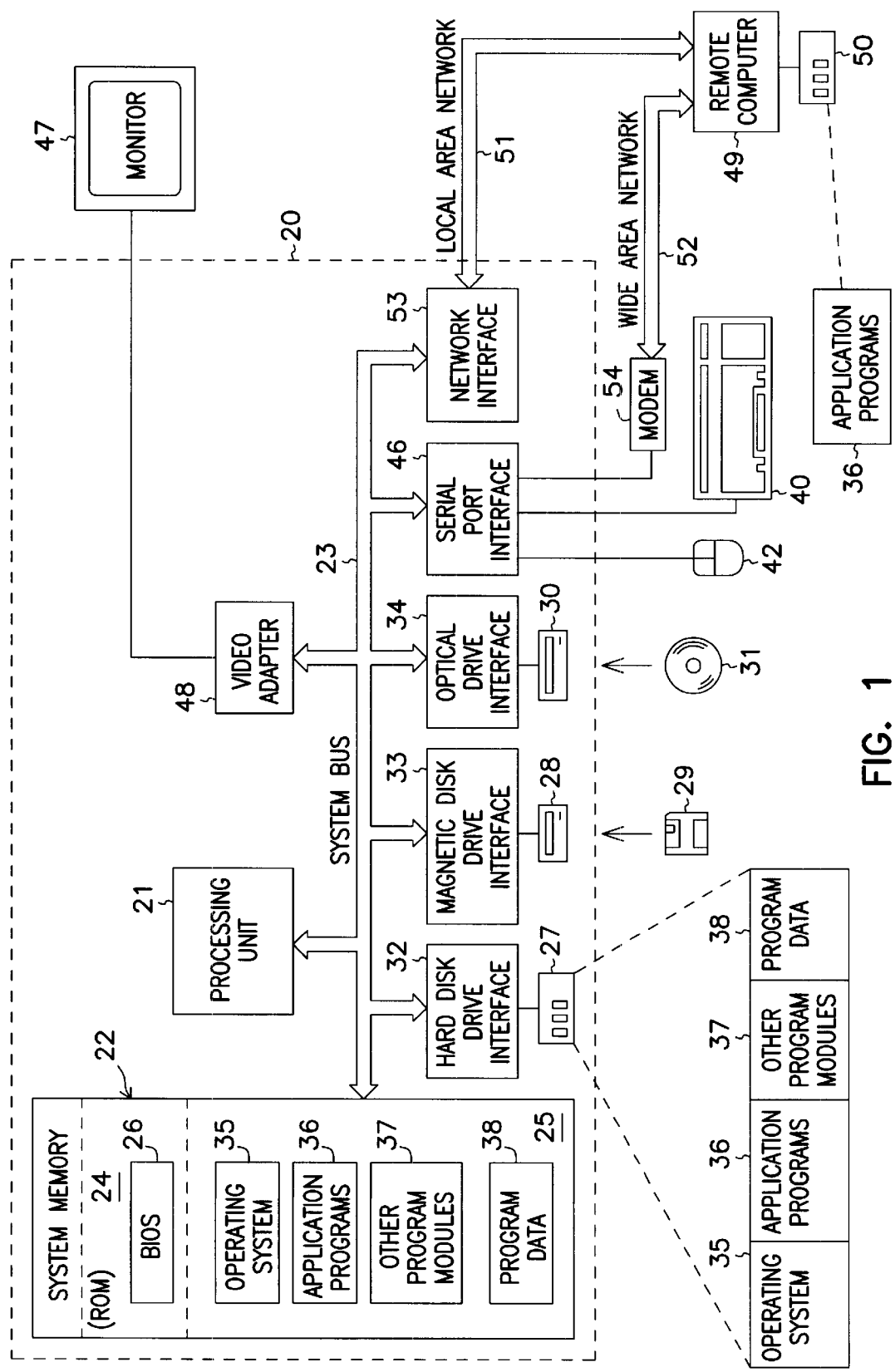
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Figure 2:
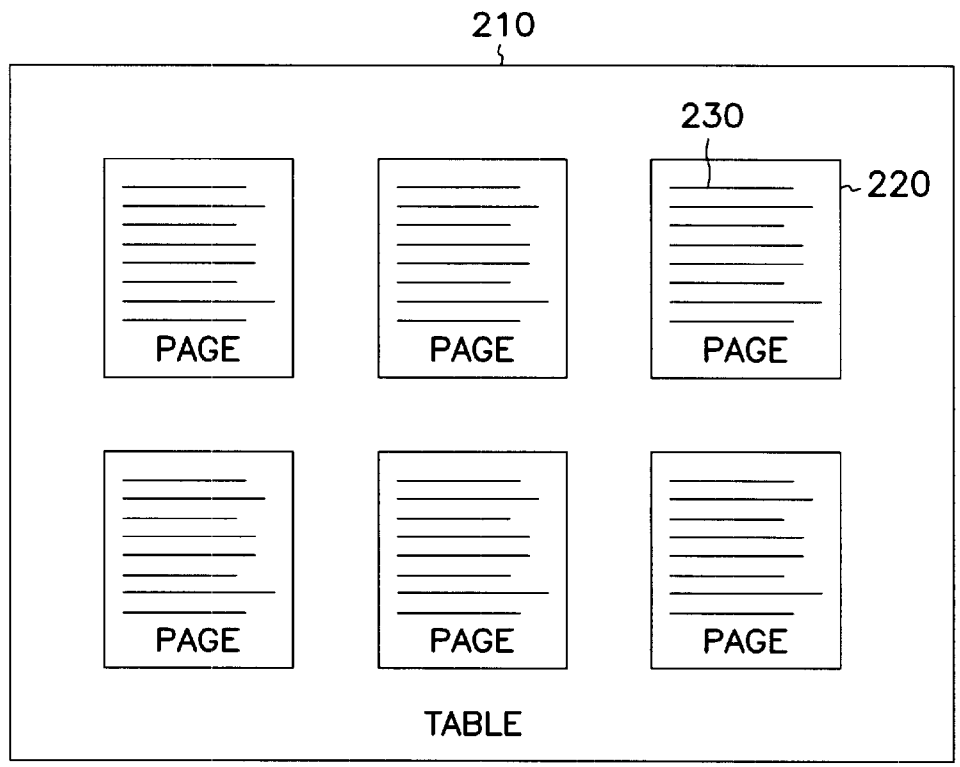
FIG. 2 is a block diagram representation of the granular relationship between rows, pages and tables in a database.

In FIG. 2, multiple granularities of data in a database are shown in block form. A table is indicated at 210, and is normally comprised of one or more pages 220 of data, each page having one or more rows of data 230 comprising the database. Six pages are shown, each having multiple rows, which may be fixed or variable in length. Normally, a row is less than a page. However, it can be quite large, sometimes consuming multiple pages. For purposes of the following discussion, it will be assumed that each page contains multiple rows. If locks are applied on a row level, significant system resources, both memory and CPU time can be consumed in a large database query which locks lots of rows. This is because each row has a separate lock which must be set by the CPU and stored in memory. Other locks or intents to lock may also be applied at higher levels of granularity, such as at the table or page level. While having a higher CPU and memory cost, the concurrency cost is very low because the locks are individually applied to small pieces of data that are least likely to be needed by other queries. The cost of system resources for each lock is equivalent regardless of the granularity of the lock. If a higher granularity of data, say the page level is locked, the cost of CPU and memory is reduced, but the concurrency cost is increased, because now it may be more likely that other queries may need the data on the locked pages, and will have to wait for access until the locking query is completed. Locking at the table level consumes still fewer system resources, but has a much higher concurrency cost since the table level usually contains many pages. The present invention determines which of these locking granularities is least costly at a run time for each query and applies that locking granularity during execution of the query.

Figure 3:
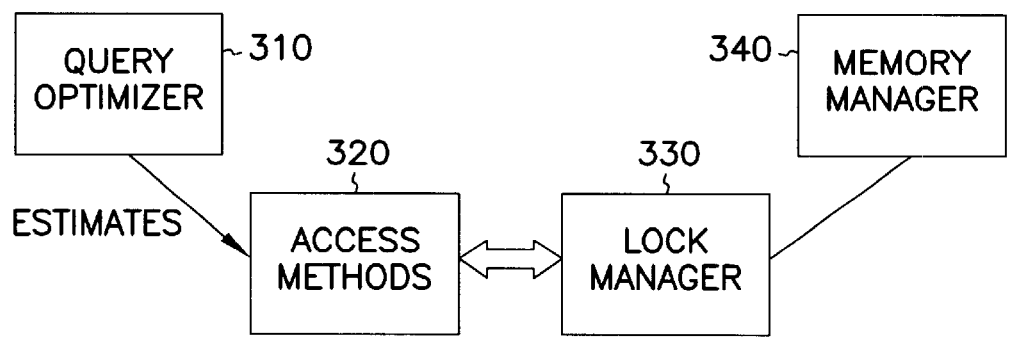
FIG. 3 is a block diagram of modules providing the functions required for a dynamic scalable lock mechanism for a database server.

A block diagram of portions of a database server, such as Microsoft's SQL Server is shown in FIG. 3. A query optimizer 310 provides estimates of the cost to a block 320 containing access methods, or programs which provide the ability to query the database. The query optimizer 310 receives queries and determines an efficient way to query the database, a portion of which is shown in FIG. 2. Once the access methods are invoked, a lock manager 330 which uses the cost estimates provided by the query optimizer in order to determine the appropriate granularity of lock to use for each query. It then interfaces with a memory manager 340 which provides memory to store the lock information within the lock manager. The memory manager 340 also provides costing information regarding the current state of the memory on the system.

A function used to determine a desired granularity of locking is shown generally at 410 in FIG. 4. The granularity selected is the one of the table, page or row level which has a minimum combined cost of three primary factors comprising memory, CPU (central processing unit) and concurrency exclusivity costs. The costs are determined based on the schema of the data base and the actual query to be executed. There are several secondary factors which determine the costs of each of the primary factors. These secondary factors comprise:

Number of rows to be scanned: This secondary factor affects both the cost of memory and CPU, since each row lock consumes both memory and CPU time to set and manage the locks.

Number or rows per page: This affects both the concurrency and CPU. If there are a high number of rows per page, page locking results in a higher concurrency cost and lower CPU cost. If there are a low number of rows per page, then the concurrency cost of locking a page is lower, and the cost savings in CPU is not great versus locking the individual rows.

Isolation level per scan: Some scans need to retain locks on all rows read during the scan, and some scans need only lock one row at a time and can release locks as the scan proceeds from one row to another.

Update factor: A percentage of scanned rows which will ultimately be updated. If a scan is estimated to touch 1000 rows, and may plan on updating only 300 of the rows, the update factor is 0.3 or 30%.

Memory load: If there is very little memory available for use, the memory cost of locking at lower granularities is very high. If there is a significant amount of memory available, then the memory cost is low regardless of the granularity.

Over locking: This factor affects concurrency costs, and is a function of the number or rows per page and the number of pages per table. If a high granularity level is selected, and the amount of data locked is much higher than would be necessary if lower granularities were selected, then the concurrency cost is higher.

Number of active scans on the table: This secondary factor most significantly affects the concurrency costs. If many scans are active, overall system performance will be decreased if the locking is done at a high level, since many scans will have to wait. The concurrency costs would be much less if locking were done on a page or row granularity.

The secondary factors affect the primary factors, and are used in a function which in one embodiment is based on empirically determining the relative costs of each of the secondary factors and normalizing them so they can be summed to provide normalized values for the cost associated with the primary factors as represented in FIG. 4.

The cost of memory is determined based by use of a quadratic equation having coefficients defined by use of well known least squares fit methods. It is partially a function of the square of the number of retained locks at each level below the highest level. The equation of FIG. 4 is used to determine the total cost of each of the granularities for a given query at run time.

One lock granularity costing algorithm comprises the following cost factors as represented in pseudocode:
CPU_COST_FACTOR=0.2;
MEMORY_COST_FACTOR=0.6;
CONC_COST_FACTOR=0.75;
CONC_EXCLUSION_PENALTY=0.2;
PAGE_LOCK_BIAS=1500.0;
TABLE_LOCK_BIAS=4000.0;
MEMORY_QUAD_COEFFICIENT=4.0E-12;

To compute table locking cost, the following function is implemented:

tableLockingCost=TABLE_LOCK_BIAS+[CONC_COST_FACTOR+(CONC_EXCLUSION_PENALTY*tableOpenCount)]*max(indexPageCount*rowsPerPage,100)

The following pseudo code is used to compute the page locking cost:
IF scan type=PROBE
THEN
  BEGIN
    IF (row fetch estimate / index page count)>50 THEN
      TouchedPages=1+indexPageCount
    ELSE
      Touchedpag es=1+(indexPageC ount*(1.0−exp(−(rowFetchEs timate / indexPageC ount))))
    END IF
  END
ELSE
  TouchedPages=[rowFetchEstimate / rowsPerPage]
END IF
LockCpuCost=TouchedPages*CPU_COST_FACTOR
IF scan mode requires retaining locks
THEN
  Retained lock count=Touched Pages
ELSE
  Retained lock count=0
END IF LockMemoryCost=retainedLocks*(MEMORY_COST_FACTOR+(4.0×10$^{-12}$*retainedLocks$^2$)PageLockingCost=PAGE_LOCK_BIAS+lockCPUCost+LockMemoryCost+[(retainedLocks+2)*rowsPerPage]*[CONC_COST_FACTOR+(CONC_EXCLUSION_PENALTY*tableOpenCount)]

The following pseudo code represents the module or modules that compute the row locking cost:
lockCPUCost=PageLockCPUCost+rowFetchEstimate*CPU_COST_FACTOR
IF (scan mode requires holding locks)
THEN
  retainedLocks=rowFetchEstimate
ELSE
  retainedLocks=rowFetchEstimate*rowUpdateFactor
ENDIF LockMemoryCost=retainedLocks*(MEMORY_COST_FACTOR+(4.0×10$^{-2}$*retainedLocks$^2$)rowLockingCost=lockCPUCost+lockMemoryCost

Conclusion

A multilevel data locking mechanism determines the cost of multiple levels or granularities of locks for a transaction prior to initiating a transaction. Locking of data can mean that during a transaction, the locked data is not available for use by other transactions, making them wait for execution until the data is unlocked. A granularity of lock is used for the transaction which is a function of cost. By using a dynamic locking strategy to determine the most cost effective granularity of locking for each transaction, overall performance is increased. It also relieves developers of having to consider locking strategies when developing applications.

While the invention has been described in the context of an SQL server lock manager, and is based on row, page and table granularities, it should be recognized that it will be useful in many other types of systems. An SQL server provides access to a database comprising rows of data arranged in tables. Data is stored in memory on pages, which are predetermined numbers of bytes, such as four thousand in one server. Many other page sizes may also be used. Usually, a table has multiple rows per page, and multiple pages per table, However, this relationship may vary from database to database, and may further include other levels of granularity, some of which are entirely logical, such as key-prefixes or groups of rows or pages.

A number of factors based on the characteristics of the database schema and query are considered in determining which granularity will result in the lowest cost. These factors include the number of rows per page, the number of rows per index scan, the isolation level per scan, an update factor which is related to the percentage of scanned rows to be modified, the memory load on the system, the cost of concurrency which is based on the number of rows per page and pages per table, and the number of active scans currently on the table. The cost may be determined by using polynomial equations having coefficients determined by a least squares fit methodology. Further, neural networks can be used following suitable training with a sample representative of expected queries. Still further, the coefficients may be empirically derived.

The present invention provides a better system performance over the prior methods of locking. By providing dynamic scalable locking based on cost, developers may focus on development of applications as opposed to trying to develop an optimal locking scheme. Determining the proper granularity at run time ensures that the current state of the system is considered, which aids in choosing the proper granularity. It also ensures that the granularity chosen is highly likely to result in a successful scan. Further, it can simplify database administration by not having to readjust locking escalation thresholds to ensure proper execution of queries.

This application is intended to cover any adaptations or variations of the present invention. It is manifestly intended that this invention be limited only by the claims and equivalents thereof.

I claim:

1. A method of determining granularity of data locking for a selected transaction, the method comprising:
   determining the cost of multiple granularities of locking prior to execution of the transaction;
   determining the granularity of locking having the minimum cost; and
   executing the transaction while locking data at the determined granularity,
wherein the cost of each granularity is a function of memory cost, CPU cost and concurrency exclusivity cost, and wherein the granularities comprise a row, page and table of a relational database and the costs are determined from one or more secondary factors comprising the number of rows to be scanned, the number of rows per page, the isolation level per scan, an update factor, a memory load factor, an over locking factor, and the number of active scans on the table.

2. The method of claim 1, wherein the cost of locking at the row and page granularities is a function of the square of the number of retained locks.

3. A data locking system comprising:
   means for determining the cost of locking multiple granularities of data; and
   means for selecting the granularity of locking having the least cost;
wherein the data comprises rows, pages and tables in a relational database system, wherein the cost of locking is a function of primary factors comprising memory, CPU, and concurrency costs, and wherein the primary factors are derived from the secondary factors from the group consisting of the number of rows to be scanned, the number of rows per page, the isolation level per scan, an update factor, a memory load factor, an over locking factor, and the number of active scans on the table.

4. A data locking system comprising:
   means for determining the cost of locking multiple granularities of data; and
   means for selecting the granularity of locking having the least cost;
wherein the data comprises rows, pages and tables in a relational database system, wherein the cost of locking is a function of primary factors comprising memory, CPU, and concurrency costs, and wherein the cost of each of the primary factors is normalized.

5. A method of determining the granularity of data locking for a selected transaction, the method comprising:
   determining the cost of locking at a row, page and table level of a relational database prior to execution of an SQL query, wherein the cost of each granularity is a function of memory cost, CPU cost and concurrency exclusivity cost;
   determining the granularity of locking having the minimum cost; and
   executing the transaction while locking data at the determined granularity,
wherein the granularities comprise a row, page and table of a relational database and the costs are determined from one or more secondary factors comprising the number of rows to be scanned, the number of rows per page, the isolation level per scan, an update factor, a memory load factor, an over locking factor, and the number of active scans on the table.

6. A data locking mechanism for a relational database system, the mechanism comprising:
   a module that determines the cost of locking at multiple different levels of data representations; and
   a module that selects the level of locking having the least system cost,
wherein the cost of locking is a function of primary factors comprising memory, CPU and concurrency costs, and wherein the primary factors are derived from secondary factors from the group consisting of the number of rows to be scanned, the number of rows per page, the isolation level per scan, an update factor, a memory load factor, an over locking factor, and the number of active scans on the table.

7. The mechanism of claim 6, wherein the cost of each of the primary factors is normalized.

8. A method of dynamically varying a granularity of data to be locked during the execution of a database transaction, the method comprising:
   determining a table locking cost at least partially based on a concurrency exclusion penalty;
   determining a page locking cost at least partially based on an estimate of the number of rows per page;
   determining a row locking cost at least partially based on an estimate of the number of rows to be fetched;
   determining the minimum of the table locking cost, the page locking cost and the row locking cost; and
   performing the transaction while locking at a granularity having the least cost.

9. The method of claim 8, wherein the cost of locking at the page granularity is a function of the square of a number of estimated retained locks.

10. A computer readable medium having instructions stored thereon for causing a computer to perform the method of claim 8.

* * * * *

UNITED STATES PATENT AND TRADEMARK OFFICE
CERTIFICATE OF CORRECTION

PATENT NO. : 6,418,438 B1
DATED : July 9, 2002
INVENTOR(S) : David G. Campbell

It is certified that error appears in the above-identified patent and that said Letters Patent is hereby corrected as shown below:

<u>Column 7,</u>
Line 54, please delete "Touchedpag es=1+ (indexPageC ount* (1.0-exp (- " and insert therefor -- Touchedpages=1+ (indexPageCount* (1.0-exp (- --.
Line 55, please delete "row (FetchEs timate / indexPage C ount ) ) ) )" and insert therefor -- rowFetchEstimate / indexPageCount ) ) ) ) --.

Signed and Sealed this

Nineteenth Day of November, 2002

Attest:

Attesting Officer

JAMES E. ROGAN
*Director of the United States Patent and Trademark Office*